United States Patent Office.

BENJAMIN R. CROASDALE, OF PHILADELPHIA, PENNSYLVANIA.

Letters Patent No. 106,918, dated August 30, 1870; antedated August 19, 1870.

IMPROVEMENT IN FERTILIZERS.

The Schedule referred to in these Letters Patent and making part of the same.

*To all whom it may concern:*

Be it known that I, BENJAMIN R. CROASDALE, of the city and county of Philadelphia and State of Pennsylvania, have invented a certain Improvement in Fertilizers from Hoofs and Horns of Animals; and I do hereby declare that the subjoined specification is a full, clear, and exact description thereof, sufficient to enable those skilled in the art to make the same.

In manufacturing a fertilizer from the hoofs and horns of animals by my improved process, I use any suitable furnace, which, heated by the direct action of fuel or by heated air, or superheated steam, and which furnace the temperature should be such as to produce the desired degree of heat (namely, about 550° Fahrenheit) without producing combustion, for, if the temperature of heat is raised too high, the ammonia in the matter heated will be expelled, and the product injured, the object being to heat them to the point where they become brittle, without expelling the ammonia, that it may be reduced or pulverized in any ordinary mill suitable for the purpose, when the matter is treated as described; it is then in a fit state to be used as a fertilizer.

Having thus described my invention,

What I claim, and desire to secure by Letters Patent, is—

A fertilizer prepared from hoofs and horns, substantially as set forth.

In testimony whereof I have signed my name to this specification in the presence of two subscribing witnesses.

B. R. CROASDALE.

Witnesses:
 J. L. LOFLAND,
 MAURICE E. FAGAN.